United States Patent
Lee et al.

(10) Patent No.: US 8,126,483 B2
(45) Date of Patent: Feb. 28, 2012

(54) METHOD FOR TRANSMITTING AND RECEIVING PAGING INFORMATION IN WIRELESS COMMUNICATION SYSTEM

(75) Inventors: Young Dae Lee, Anyang-si (KR); Sung Duck Chun, Anyang-si (KR); Sung Jun Park, Anyang-si (KR); Seung June Yi, Anyang-si (KR)

(73) Assignee: LG Electronics Inc., Seoul (KR)

(*) Notice: Subject to any disclaimer, the term of this patent is extended or adjusted under 35 U.S.C. 154(b) by 284 days.

(21) Appl. No.: 12/532,144

(22) PCT Filed: Mar. 21, 2008

(86) PCT No.: PCT/KR2008/001578
§ 371 (c)(1),
(2), (4) Date: Sep. 18, 2009

(87) PCT Pub. No.: WO2008/115018
PCT Pub. Date: Sep. 25, 2008

(65) Prior Publication Data
US 2010/0087210 A1    Apr. 8, 2010

(30) Foreign Application Priority Data
Mar. 21, 2007    (KR) .................. 10-2007-0027635

(51) Int. Cl.
*H04W 68/00*    (2009.01)
(52) U.S. Cl. ..................... 455/458; 455/466

(58) Field of Classification Search .......... 455/450–466; 370/328–351
See application file for complete search history.

(56) References Cited

U.S. PATENT DOCUMENTS

| 5,909,651 | A * | 6/1999 | Chander et al. | 455/466 |
| 6,300,864 | B1 * | 10/2001 | Willey | 340/7.43 |
| 2003/0016652 | A1 * | 1/2003 | Ma et al. | 370/349 |

OTHER PUBLICATIONS

S. Yang et al., "An Adaptive Discontinuous Reception Mechanism Based on Extended Paging Indicator for Power Saving in UMTS," IEEE 64th Vehicular Technology Conference, Sep. 2006.
Jee-Hyeon Na et al., "Two Alternative Registration and Paging Schemes for Supporting Idle Mode in IEEE 802.16e Wireless MAN," IEEE 64th Vehicular Technology Conference, Sep. 2006.

* cited by examiner

*Primary Examiner* — Kent Chang
*Assistant Examiner* — Kashif Siddiqui
(74) *Attorney, Agent, or Firm* — Lee, Hong, Degerman, Kang & Waimey

(57) ABSTRACT

A method of transmitting paging information in a wireless communication system includes transmitting a paging occasion for a user equipment and transmitting a paging message including at least one paging frame and paging control information to indicate information of the paging message with respect to the user equipment during the paging occasion.

11 Claims, 5 Drawing Sheets

METHOD FOR TRANSMITTING AND RECEIVING PAGING INFORMATION IN WIRELESS COMMUNICATION SYSTEM

CROSS-REFERENCE TO RELATED APPLICATIONS

This application is a national stage application of International Application No. PCT/KR 2008/001578, filed on Mar. 21, 2008, which claims the benefit of earlier filing date and right of priority to Korean Application No. 10-2007-0027635, filed on Mar. 21, 2007, the contents of all of which are hereby incorporated by reference herein in their entirety.

TECHNICAL FIELD

The present invention relates to wireless communication, and more particularly, to a method of transmitting or receiving paging information, in which a network pages a user equipment in a wireless communication system.

BACKGROUND ART

Third generation partnership project (3GPP) mobile communication systems based on a wideband code division multiple access (WCDMA) radio access technique are widely spread all over the world. High-speed downlink packet access (HSDPA) that can be defined as a first evolutionary stage of WCDMA provides 3GPP with wireless access technique that is highly competitive in the mid-term future. However, since requirements and expectations of users and service providers are continuously increased and developments of competing radio access techniques are continuously in progress, new technical evolutions in 3GPP are required to secure competitiveness in the future. Reduction of cost per bit, increase of service availability, flexible use of frequency bands, simple structure and open interface, proper power consumption of a user equipment, and the like are defined as requirements.

Paging refers to an action in which a network pages one or more user equipments so as to perform a specific purpose. Paging has a function of saving power of a user equipment by preventing the user equipment from waking up except for necessary cases as well as a basic function of allowing a network to find a location a user equipment. When a user equipment receives a paging message is received from a network in a sleep mode, the user equipment wakes up and then performs an action requested by the network.

In order for the user equipment, which is in the sleep mode, to notice arrival of paging, the user equipment wakes up periodically and check whether paging information is arrived. What a user equipment does not always wake up, but wakes up periodically is generally called Discontinuous Reception (hereinafter, referred to as "DRX").

When receiving a paging message, a user equipment can perform DRX to reduce power consumption. A network configures several paging occasions during a paging DRX cycle. A specific user equipment can receive a paging message at a specific paging occasion. The user equipment does not receive the paging message at times other than the specific paging occasion. One paging occasion may correspond to one TTI (Transmission Time Interval).

In general, the size of a paging message to call (or page) one user equipment is fixed. There is a need for a method of paging a user equipment efficiently depending on the size of a paging message by employing a paging occasion.

DISCLOSURE OF INVENTION

Technical Problem

A method is sought for preventing the delay of paging messages in such a manner that a user equipment sets a specific paging occasion every paging DRX cycle, receives a specific paging frame constituting the paging occasion every paging DRX cycle, and thus acquires paging control information, and when the paging control information indicates transmission of a paging message, the user equipment receives one or more paging frames during the period of time indicated by the paging control information and acquires a paging message.

Technical Solution

In one aspect, a method of transmitting paging information in a wireless communication system is provided. The method includes transmitting a paging occasion for a user equipment and transmitting a paging message including at least one paging frame and paging control information to indicate information of the paging message with respect to the user equipment during the paging occasion.

In another aspect, a method of enabling a user equipment to receive paging information in a wireless communication system is provided. The method includes receiving a paging occasion and receiving a paging indicator during the paging occasion and receiving the user equipment's own paging message by employing the paging indicator.

Advantageous Effects

In a wireless communication system, a paging occasion is configured every paging DRX cycle of a downlink paging channel for a user equipment. The paging occasion is comprised of a plurality of paging frames. In the case where a paging message for the user equipment is transmitted during the paging occasion, paging control information and a paging message are transmitted through a specific paging frame constituting the paging occasion, and the paging control information indicates the size of a paging frame where the paging message is transmitted. Accordingly, delay of the paging message can be minimized even if the size of the paging message is variable.

MODE FOR THE INVENTION

Figure 1:
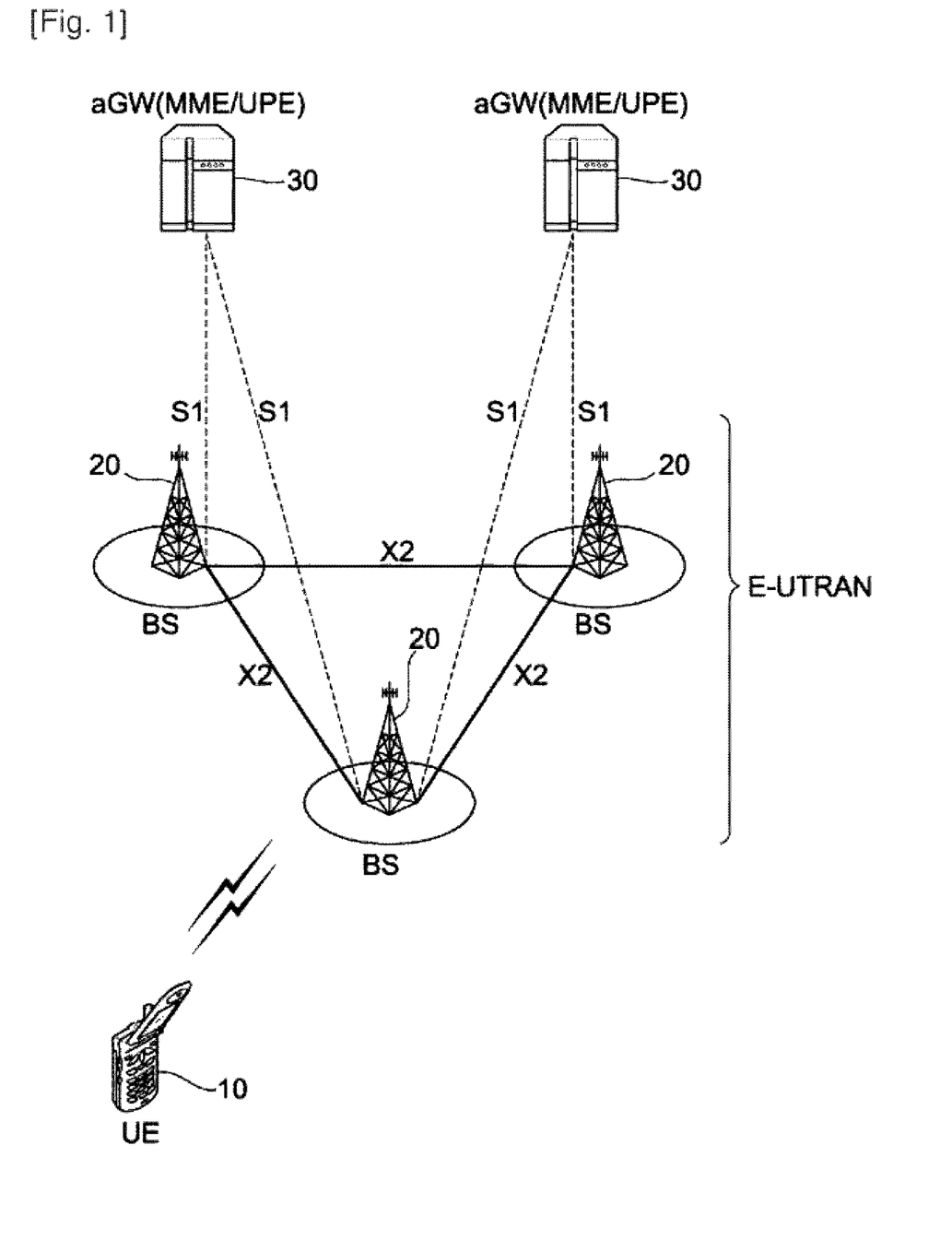
FIG. 1 is a block diagram showing a wireless communication system.

FIG. 1 is a block diagram showing a wireless communication system. This may be a network structure of an E-UMTS (Evolved-Universal Mobile telecommunications System). The E-UMTS system may be referred to as an LTE (Long-term Evolution) system. The wireless communication system can widely be deployed to provide a variety of communication services, such as voices, packet data, and the like.

Referring to FIG. 1, an E-UTRAN (Evolved-UMTS Terrestrial Radio Access Network) includes base-stations (BS) 20. A user equipment 10 can be fixed or mobile and can be referred to as another terminology, such as a MS (Mobile Station), a UT (User Terminal), a SS (Subscriber Station), a wireless device, or the like. The base station 20 generally is a fixed station that communicates with the user equipment 10 and can be referred to as another terminology, such as an e-NB (evolved-NodeB), a BTS (Base Transceiver System), an access point, or the like. There are one or more cells within the coverage of the base station 20. An interface for transmitting user traffic or control traffic can be used between base stations 20. Hereinafter, downlink means a communication from the base station 20 to the user equipment 10, and uplink means a communication from the user equipment 10 and the base station 20.

The base station 20 provides the user equipment 10 with termination points of a user plane and a control plane. The base stations 20 can be connected with each other through an X2 interface, and adjacent base stations 20 can have a network of a meshed structure where the X2 interface always exists.

The base station 20 is connected to an EPC (Evolved Packet Core), further specifically, to an aGW (access Gateway) 30 through an S1 interface. The aGW 30 provides a termination point of session and mobility management function of the user equipment 10. A plurality of nodes of the base stations 20 and the aGWs 30 can be connected to each other in a many-to-many relation through the S1 interface. The aGW 30 can be divided into a part for processing user traffic and a part for processing control traffic. In this case, the part for processing user traffic and the part for processing control traffic can communicate with each other through a new interface. The aGW 30 also can be referred to as an MME/UPE (Mobility Management Entity/User Plane Entity).

Layers of the radio interface protocol between the user equipment and the base station can be classified into L1 (a first layer), L2 (a second layer), and L3 (a third layer) based on the lower three layers of the Open System Interconnection (OSI) model that is well-known to communication systems. The physical layer belonging to the first layer provides information transfer service using a physical channel. A radio resource control (RRC) layer belonging to the third layer serves to control radio resources between the user equipment and the network. The user equipment and the network exchange RRC messages via the RRC layer. The RRC layer can be distributed among network nodes, such as the base station, the aGW, and the like. Or the RRC layer can be located only in the base station or the aGW.

Figure 2:
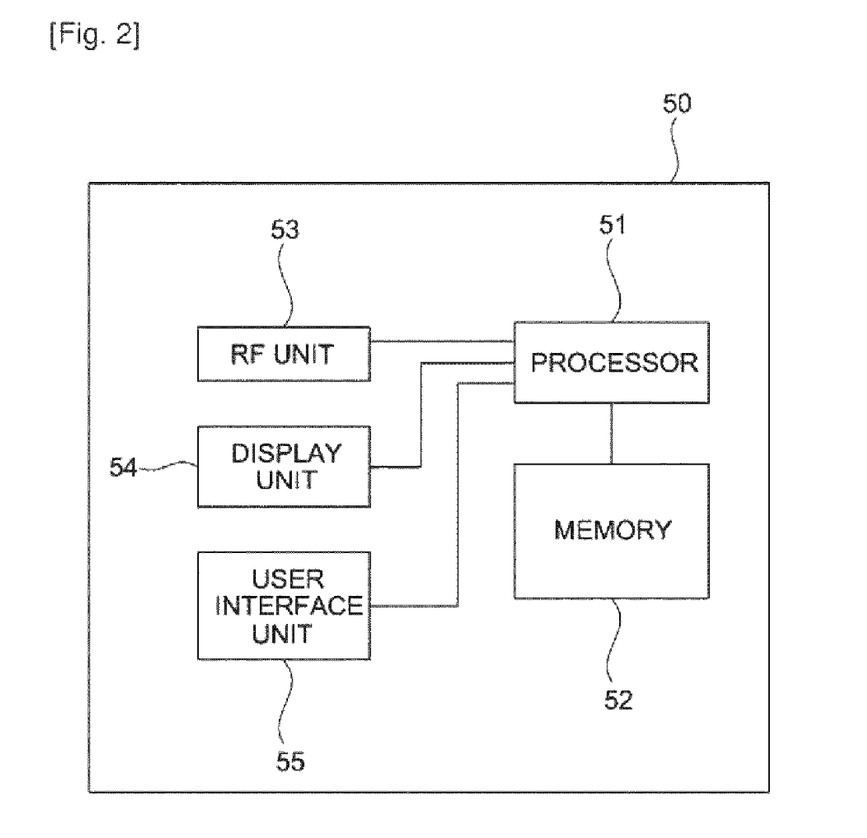
FIG. 2 is a block diagram showing constitutional elements of a user equipment.

FIG. 2 is a block diagram showing constitutional elements of a user equipment. A user equipment 50 includes a processor 51, memory 52, an RF unit 53, a display unit 54, and a user interface unit 55. The memory 52 coupled with the processor 51 stores operating systems, applications, and general files. The display unit 54 displays a variety of information on the user equipment and may use a well-known element, such as an LCD (Liquid Crystal Display), OLED (Organic Light Emitting Diode), or the like. The user interface unit 55 can be configured with a combination of well-known user interfaces such as a keypad, a touch screen, and the like. The RF unit 53 coupled to the processor 51 transmits and/or receives radio signals.

Functions of layers of the radio interface protocol can be implemented in the processor 51. The processor 51 can provide a control plane and a user plane.

Figure 3:
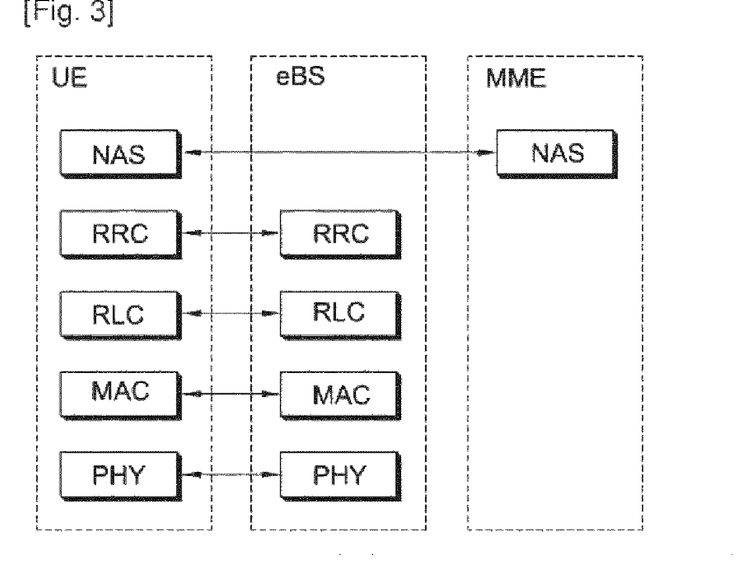
FIG. 3 is a block diagram showing a radio interface protocol architecture.

FIG. 3 is a block diagram showing a radio interface protocol architecture. This shows the structure of the radio interface protocol between the user equipment and the E-UTRAN based on the 3GPP radio access network specification.

Referring to FIG. 3, the radio interface protocol classified horizontally into a physical layer, a data link layer, and a network layer, and classified vertically into a user plane for carrying data traffic such as voice signals and Internet protocol packet transmissions and a control plane for carrying control information for the maintenance and management of the interface.

The physical layer belongs to a first layer, provides an information transfer service to an upper layer through a physical channel. The physical layer is coupled to a MAC (Medium Access Control) layer, i.e., an upper layer of the physical layer, through a transport channel. Data are transferred between the MAC layer and the physical layer through the transport channel. Between different physical layers, i.e., the physical layer of a transmitter and the physical layer of a receiver, data are transferred through the physical channel. The physical layer can be modulated by orthogonal frequency division multiplexing (OFDM). Time and/or frequency can be utilized as radio resources.

The MAC layer provides a service to a RLC (Radio Link Control) layer, i.e., an upper layer of the MAC layer, through a logical channel. The RLC layer in the second layer supports the transmission of data with reliability. The functions of the RLC layer can be implemented as a functional block within the MAC layer, and in this case, the RLC layer may not exist.

A PDCP (Packet Data Convergence Protocol) belonging to the second layer performs header compression function. When transmitting an Internet Protocol (IP) packet such as an IPv4 packet or an IPv6 packet, the header of the IP packet may contain relatively large and unnecessary control information. The PDCP layer reduces the header size of the IP packet so as to efficiently transmit the IP packet.

A RRC (Radio Resource Control) layer belonging to the third layer is defined only in the control plane. The RRC layer serves to control the logical channel, the transport channel, and the physical channel in association with configuration, reconfiguration, and release of Radio Bearers (RBs). The RB signifies a service provided by the second layer for data transmission between the user equipment and the network. When a RRC connection is established between the RRC layer of a user equipment and the RRC layer of a network, the user equipment is in the RRC connected mode. Before the RRC connection is established, the user equipment is in the RRC idle mode.

A NAS (Non-Access Stratum) layer belongs to the upper layer of the RRC layer serves to perform session management and mobility management.

A cell can be set to one of bandwidths, including 1.25 MHz, 2.5 MHz, 5 MHz, 10 MHz, 20 Mhz, etc., and provides several user equipments with downlink or uplink transmission service. Different cells can be set to provide different bandwidths.

Downlink transport channels include a BCH (Broadcast Channel) that transmits system information, a PCH (Paging Channel) that transmits paging messages, and a downlink SCH (Shared Channel) that transmits user traffic or control messages. Traffic or control messages of downlink multicast or broadcast service may be transmitted through the downlink SCH or a downlink MCH (Multicast Channel). Uplink transport channels include a RACH (Random Access Channel) that is used for initial access to a cell and an uplink SCH (Shared Channel) that transmits user traffic or control messages.

Logical channels mapped to the transport channel include a BCCH (Broadcast Channel), a PCCH (Paging Control Channel), a CCCH (Common Control Channel), a MCCH (Multicast Control Channel), a MTCH (Multicast Traffic Channel), and so on.

Figure 4:
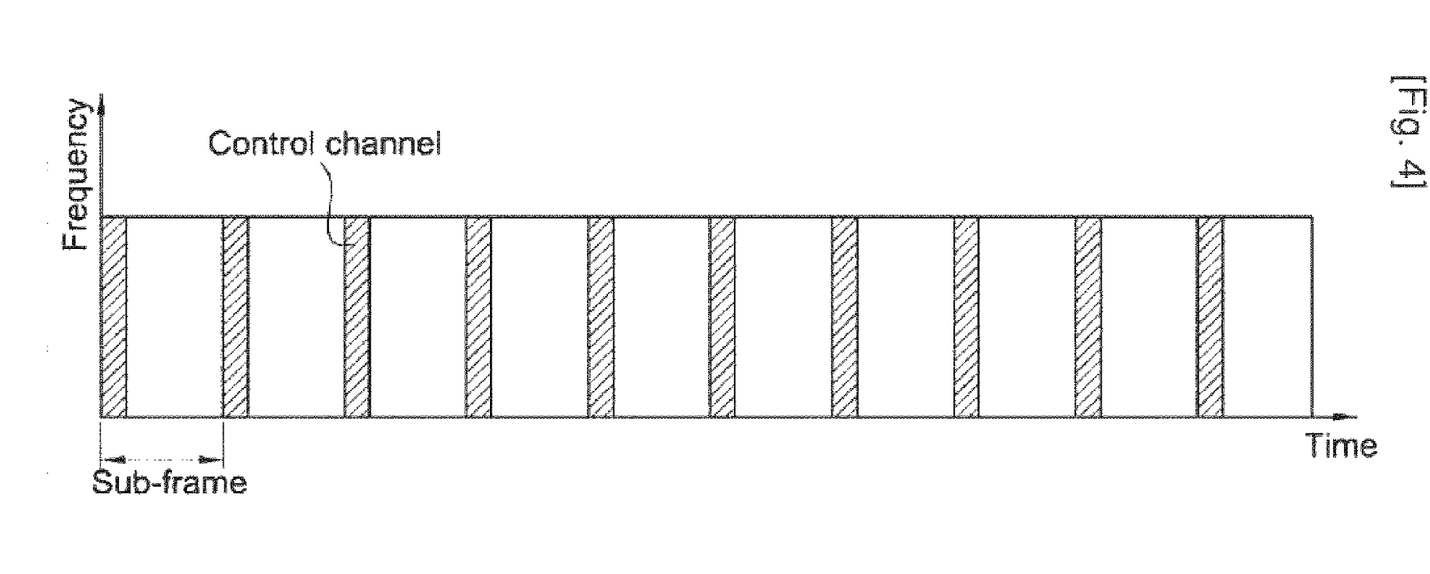
FIG. 4 shows an example of a physical channel.

FIG. 4 shows an example of a physical channel.

Referring to FIG. 4, a physical channel is comprised of a plurality of OFDM symbols on time domain and a plurality of sub-carriers on frequency domain. One resource block is comprised of a plurality of symbols and a plurality of sub-carriers. One sub-frame can comprise at least one resource block.

A part of a sub-frame can be assigned for a control channel, which is called as a PDCCH (Physical Downlink Control Channel). Another part of a sub-frame can be assigned for a data channel, which is called as a PDSCH (Physical Downlink Shared Channel). One sub-frame can have the length of, for example, 1 ms and the TTI (Transmission Time Interval) is the interval for one sub-frame.

Figure 5:
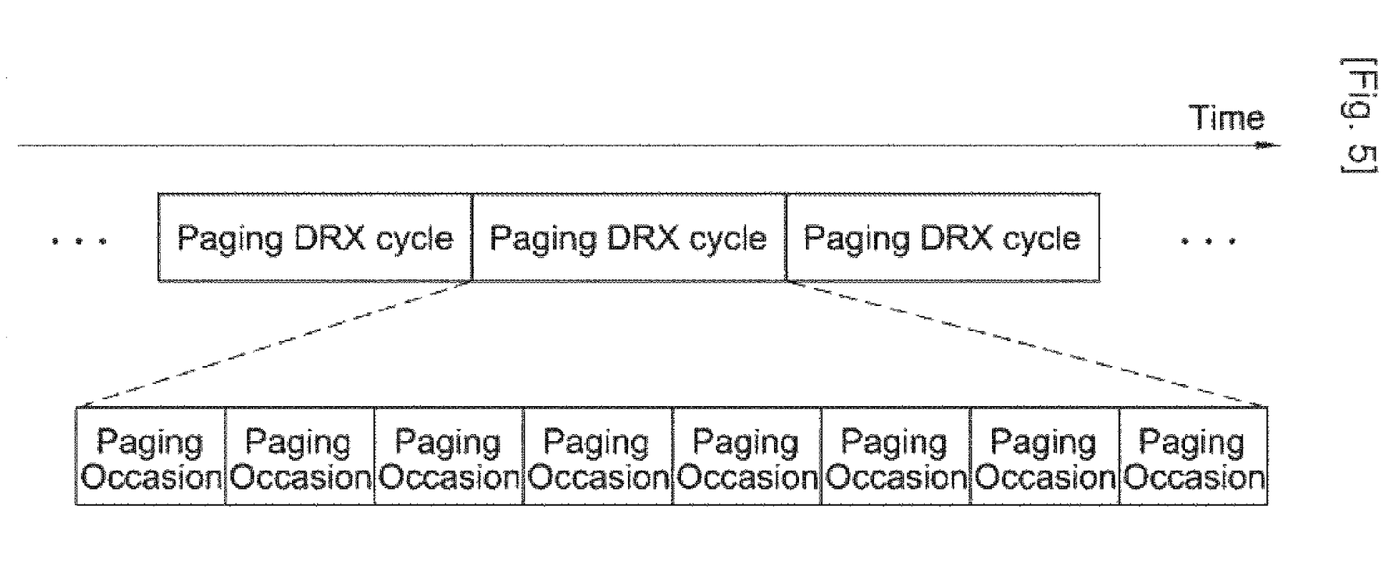
FIG. 5 shows an example of paging channel transmission.

FIG. 5 shows an example of paging channel transmission.

Referring to FIG. 5, when receiving a paging message, a user equipment can perform DRX (Discontinuous Reception) for the purpose of reducing power consumption. To this end, a network configures a plurality of paging occasions every period of time called a paging DRX cycle. The user equipment can receive only one paging occasion of the plurality of paging occasions and receive its own paging message. The user equipment does not receive a paging channel at times other than one paging occasion. One paging occasion corresponds to one TTI.

In general, a paging message for one user equipment has the size of about 40-50 bits. It is assumed that a cell providing a 1.25 MHz bandwidth transmits a paging message. If the paging message pages two or more user equipments, paging messages cannot be transmitted through one paging occasion, that is, one TTI. Thus, a problem arises because one of the two user equipments is paged with delay after one paging DRX cycle.

In order for preventing delay of a paging message, a network configures a specific paging occasion every paging DRX cycle of a downlink paging channel for a specific user equipment. The specific paging occasion includes a plurality of paging frames. When a paging message for the user equipment is transmitted on the paging occasion, paging control information and the paging message are transmitted through a specific paging frame constituting the paging occasion, and the paging control information indicates the size of the paging frame where the paging message is transmitted.

The user equipment configures a specific paging occasion every paging DRX cycle, receives a specific paging frame constituting the paging occasion every paging DRX cycle, and acquires paging control information. When the paging control information indicates transmission of a paging message, the user equipment receives one or more paging frames during the period of time indicated by the paging control information and acquires the paging message.

The paging control information can be a paging indicator (PI) transmitted through the PDCCH or the L1/L2 control channel.

The paging message on the paging frame can be transmitted through a downlink paging channel.

The paging control information includes the number of paging frames, which must be received by a user equipment in order to receive a paging message, or a a period of time where a paging message is transmitted. The user equipment receives a paging frame according to the number of the paging frames or the period of time and stops the reception of a paging frame after the number of the paging frames or after the period of time, where the paging message is transmitted.

The paging control information can include the position of the paging frame at which the paging message for the user equipment is transmitted, information about a resource block where the paging message is transmitted, or information about a sub-carrier and a symbol where the paging message is transmitted.

Figure 6:
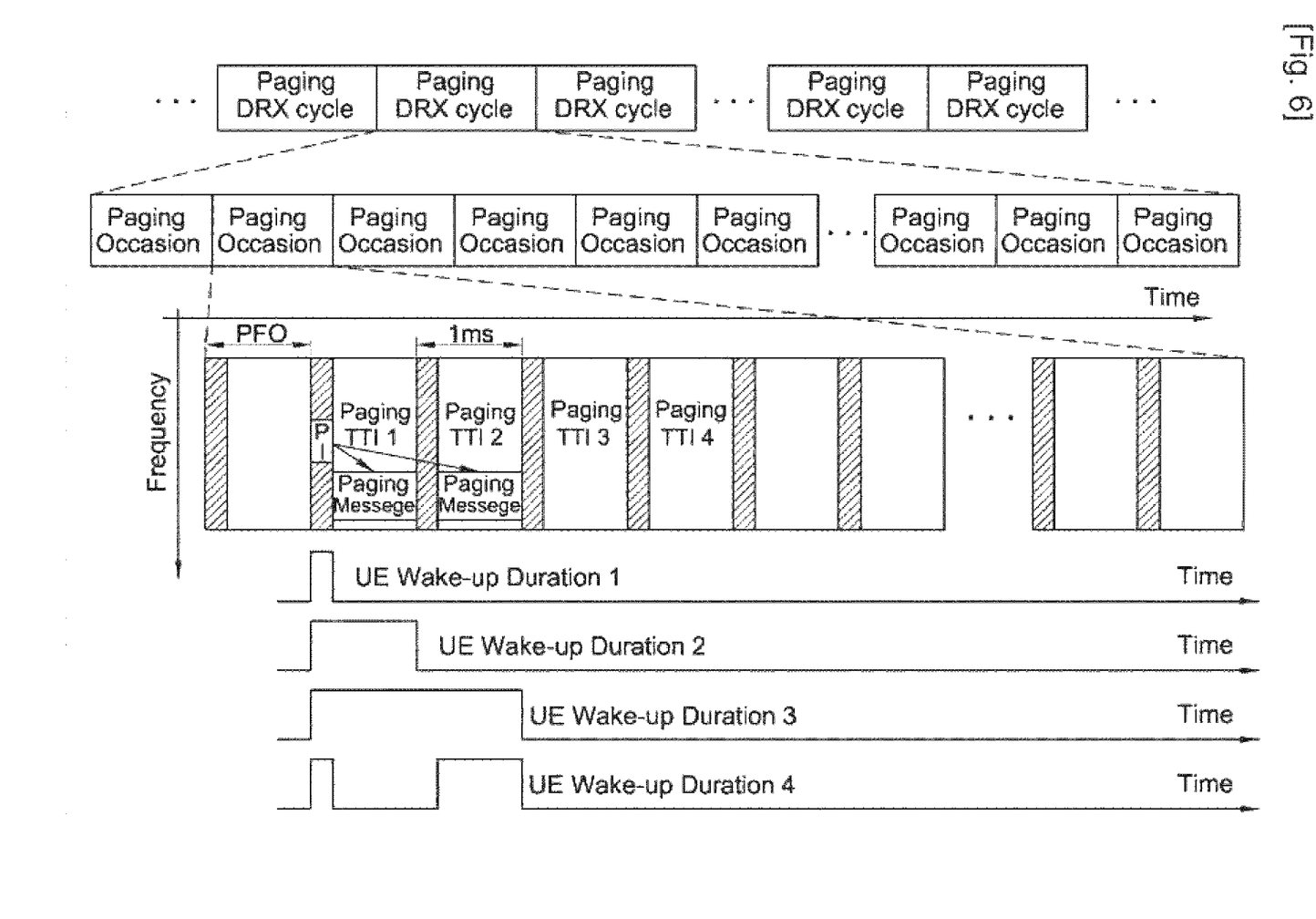
FIG. 6 illustrates a paging method in accordance with an embodiment of the present invention.

FIG. 6 illustrates a paging method in accordance with an embodiment of the present invention.

Referring to FIG. 6, a network configures a paging DRX cycle, that is, a DRX cycle where a paging message is transmitted. One paging DRX cycle includes one or more paging occasions. One paging occasion is comprised of one or more TTIs. One TTI is comprised of one or more sub-frames.

When a paging message is transmitted through one TTI or one sub-frame, a PDCCH channel transmits a PI (Paging Indicator) so as to inform that a paging message for a paging group to which a specific user equipment belongs is transmitted through a specific resource block. A TTI where a paging message can be transmitted during one paging occasion is specified. The TTI where the paging message can be transmitted as described above is called a paging TTI. A time lag between the start of a paging occasion and the start of a first paging TTI is called a PFO (Paging Frame Offset).

A paging message transmission method is as follows. A base station sets one or more paging TTIs where paging messages will be sent within a paging occasion. The base station makes a specific user equipment identifier correspond to a specific paging occasion. Thus, a user equipment can receive a paging message through only a paging occasion corresponding to its own user equipment identifier.

The base station transmits paging information to user equipments through system information. Each user equipment checks a paging occasion corresponding to its own user equipment identifier within the paging DRX cycle based on the paging information and recognizes a paging TTI set to a corresponding paging occasion. The system information transmitted by the base station further includes positioning information of a paging TTI. A user equipment checks the position of a paging TTI based on the system information.

If there is a paging message to be sent to a specific user equipment, the base station informs a user equipment group to which the user equipment belongs of the fact that the paging message will be transmitted during a specific paging TTI through a PI of a PDCCH channel. The PI includes an identifier of the user equipment group to which the user equipment belongs or an identifier of the user equipment, and informs transmission information about the paging message and information about a resource block. The transmission information can include AMC (Adaptive Modulation and Coding) information and/or HARQ (Hybrid Automatic Repeat Request) information.

The PDCCH channel through which the PI is transmitted informs the length of the paging TTI where the paging message is transmitted. For example, the PDCCH channel can inform whether the paging message is transmitted during one TTI, that is, 1 ms or during two TTIs, that is, 2 ms. Alternatively, the PDCCH channel can inform whether the paging message is transmitted through one sub-frame or two sub-frames. Through this method, if the size of a paging message exceeds the length of one paging TTI, the base station can transmit the paging message through two or more paging TTIs.

In order to reduce the amount of information transmitted through the PDCCH channel, a PI can carry only information about a first TTI and a user equipment that has received the PI can receive a paging message transmitted on a second TTI by employing the information about the first TTI. For example, in FIG. 6, a PI can carry only information about a paging message, which is transmitted through a paging TTI No. 1, and a base station can transmit paging messages, which are transmitted through paging TTI Nos. 1 and 2, in the same format. Here, a user equipment can receive a PI transmitted through the paging TTI No. 1, and receive the paging message of the paging TTI No. 1 and the paging message of the paging TTI No. 2 by employing the information about the paging message of the paging TTI No. 1 included in the PI. The information about the paging message includes transmission information of the paging message and information about a resource block.

The PDCCH channel can inform that a paging message for a specific user equipment group to which a specific user equipment belongs is transmitted through a specific one of the paging TTIs. For example, a PI of the PDCCH, which is located at the paging TTI No. 1 in FIG. 6, can inform that a paging message for the user equipment is transmitted through a paging TTI No. 3.

A PI can be transmitted to the entire sub-frames belonging to the entire paging TTIs during the paging occasion. Alternatively, a PI can be transmitted through a specific sub-frame of the entire paging TTIs or only through a sub-frame belonging to a specific paging TTI during the paging occasion. When a PI is transmitted through a plurality of paging TTIs during the paging occasion, a user equipment can receive the PI only through a paging TTI corresponding to its own user equipment identifier. When a PI is transmitted through a specific paging TTI during the paging occasion, a user equipment can receive the PI only during the specific paging TTI.

The user equipment receives the PI after the PFO at the start of a corresponding paging occasion. An operation of the user equipment after receiving the PI is described below.

(1) If a PI does not include a user equipment identifier of the user equipment or an identifier of a user equipment group to which the user equipment belongs, the user equipment determines that there is no paging message transmitted thereto, receives paging messages only during a 'UE wake-up duration 1' where a PI is received, and temporarily stops the reception, as shown in FIG. 6.

(2) If a PI includes a user equipment identifier of the user equipment or an identifier of a user equipment group to which the user equipment belongs, and the PI informs that a paging message for a corresponding user equipment is transmitted during a current paging TTI or that a paging message is transmitted during one TTI, that is, 1 ms, the user equipment wakes up during a 'UE wake-up duration 2' and receives the paging message, as shown in FIG. 6.

(3) If a PI includes a user equipment identifier of the user equipment or an identifier of a user equipment group to which the user equipment belongs, and the PI informs that paging messages for a corresponding user equipment are transmitted during two TTIs, that is, 2 ms, the user equipment wakes up during a 'UE wake-up duration 3' and receives the paging messages, as shown in FIG. 6.

(4) If a PI includes a user equipment identifier of the user equipment or an identifier of a user equipment group to which the user equipment belongs, and the PI informs that a paging message for a corresponding user equipment is transmitted during a next second TTI, the user equipment wakes up during a 'UE wake-up duration 4' and receives the paging message, as shown in FIG. 6.

The functions described in connection with the embodiments disclosed herein may be performed by implemented by hardware, software or a combination thereof. The hardware may be implemented by a microprocessor, a controller, an application specific integrated circuit (ASIC) and a processor. Design, development and implementation of the software are well known to those skilled in the art based on the

DETAILED DESCRIPTION

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method of transmitting a paging message by a base station in a wireless communication system during a discontinuous reception (DRX) cycle including a plurality of paging occasions, each of the plurality of paging occasions including a plurality of paging transmission time intervals (TTIs), the method comprising:
setting at least one paging TTI of the plurality of paging TTIs of a specific paging occasion of the plurality of paging occasions for transmission of the paging message;
transmitting paging control information through a physical downlink control channel (PDCCH), the paging control information indicating the transmission of the paging message during the at least one paging TTI, the paging control information including an identifier corresponding to the specific paging occasion; and
transmitting the paging message through a downlink paging channel during the at least one paging TTI.

2. The method of claim 1, wherein the paging control information further includes information regarding a length of the at least one paging TTI.

3. The method of claim 1, wherein the paging control information further includes information regarding a position in time of the at least one paging TTI.

4. The method of claim 1, wherein the paging control information further includes information regarding a resource block in which the paging message is transmitted in a frequency domain during the at least one paging TTI.

5. The method of claim 1, wherein the paging control information is a paging indicator (PI).

6. The method of claim 1, wherein each of the plurality of paging TTIs includes at least one subframe.

7. A method of receiving a paging message by a user equipment in a wireless communication system during a discontinuous reception (DRX) cycle including a plurality of paging occasions, each of the plurality of paging occasions including a plurality of paging transmission time intervals (TTIs), the method comprising:
receiving paging control information through a physical downlink control channel (PDCCH), the paging control information indicating a transmission of the paging message during at least one paging TTI of the plurality of paging TTIs; and
detecting an identifier of the user equipment from the paging control information, receiving the paging message through a downlink paging channel during the at least one paging TTI if the identifier of the user equipment is detected.

8. The method of claim 7, wherein the paging control information includes information regarding a length of the at least one paging TTI.

9. The method of claim 7, wherein the paging control information includes information regarding a position in time of the at least one paging TTI.

10. The method of claim 7, wherein the paging control information includes information regarding a resource block in which the paging message is transmitted in a frequency domain during the at least one paging TTI.

11. The method of claim 7, wherein the paging control information is a paging indicator (PI).

* * * * *